(12) United States Patent
Rabindran

(10) Patent No.: US 7,271,352 B2
(45) Date of Patent: Sep. 18, 2007

(54) SYSTEM FOR HIGH-SPEED AUTOMATIC WEIGHING OF ITEMS IN A MAIL STREAM

(76) Inventor: K. George Rabindran, 4022 W. Lake Estates Dr., Davie, FL (US) 33328-3065

( * ) Notice: Subject to any disclaimer, the term of this patent is extended or adjusted under 35 U.S.C. 154(b) by 0 days.

(21) Appl. No.: 11/213,134

(22) Filed: Aug. 26, 2005

(65) Prior Publication Data

US 2007/0050315 A1    Mar. 1, 2007

Related U.S. Application Data

(60) Provisional application No. 60/605,999, filed on Aug. 31, 2004.

(51) Int. Cl.
*G01G 21/22*  (2006.01)

(52) U.S. Cl. .................. 177/25.15; 177/126; 177/262; 705/407

(58) Field of Classification Search ............... 705/407; 177/25.15, 126, 145, 262
See application file for complete search history.

(56) References Cited

U.S. PATENT DOCUMENTS

| | | | |
|---|---|---|---|
| 4,561,352 A | 12/1985 | Svyatsky et al. | |
| 4,742,878 A | 5/1988 | Freeman et al. | |
| 4,756,520 A | 7/1988 | Clark, Jr. et al. | |
| 4,956,782 A * | 9/1990 | Freeman et al. | 705/406 |
| 5,083,281 A | 1/1992 | Rabindran et al. | |
| 5,256,835 A | 10/1993 | Rydzak | |
| 5,308,934 A | 5/1994 | Miller et al. | |
| 5,319,161 A | 6/1994 | Miller et al. | |
| 5,359,154 A * | 10/1994 | Tsukasa et al. | 177/145 |
| 5,856,637 A * | 1/1999 | Vande Berg | 177/145 |
| 6,044,364 A | 3/2000 | DeFilippo et al. | |
| 6,107,579 A * | 8/2000 | Kinnemann | 177/145 |
| 6,265,675 B1 * | 7/2001 | Hubler et al. | 177/25.15 |
| RE38,233 E * | 8/2003 | Vande Berg | 177/145 |
| 6,713,689 B2 | 3/2004 | Eaton et al. | |
| 6,759,602 B2 | 7/2004 | Miller et al. | |
| 6,861,592 B2 * | 3/2005 | Gerstenberg et al. | 177/1 |

\* cited by examiner

*Primary Examiner*—Randy W Gibson

(57) ABSTRACT

An apparatus for weighing mail pieces being advanced across a transport path including a weighing module having load cells, an in-feed drive module and a takeaway module. The scale platform is mounted independently of the in-feed drive module and the takeaway module, and the scale platform comprises an uninterrupted mail piece support surface. A control system is provided that acquires a mail piece weight signal when the lead edge of a mail piece reaches a sensor at the exit of the weighing module. Sensors also calculate the velocity of a mail piece as it leaves the weighing module, whereby speed of each mail piece is accelerated to its original speed and position in the mail transport path. Mail weighing throughput rates of up to 10 mail pieces per second are achieved.

12 Claims, 4 Drawing Sheets

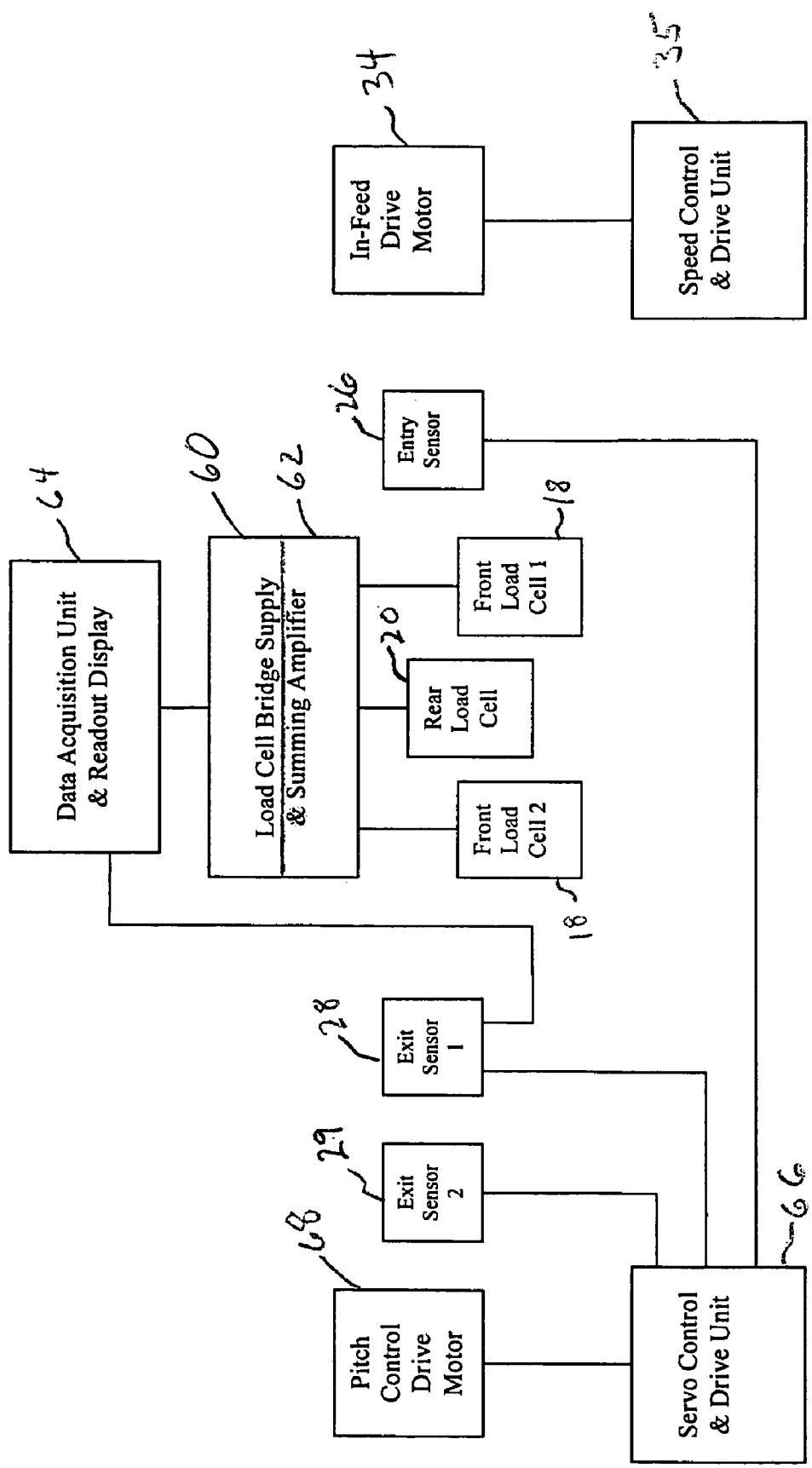

SYSTEM FOR HIGH-SPEED AUTOMATIC WEIGHING OF ITEMS IN A MAIL STREAM

RELATED APPLICATION

This application is based upon provisional patent application Ser. No. 60/605,999, filed Aug. 31, 2004, titled "System for High-Speed Automatic Weighing of Items in a Mailstream", to the extent allowed by law.

FIELD OF INVENTION

The present invention relates to high-speed automatic weighing of items in a mail stream, and in particular to a system that provides a mail piece weighing station free of the transport components that slow down the throughput performance of present mail weighing systems.

BACKGROUND OF THE INVENTION

In existing implementations for weighing of mail items in a stream, the means for transporting the article through the scale, such as a conveyor system, is made part of the scale platform. This increases the tare weight of the scale, resulting in increased settling time, which is the time between the full weight of the article being supported on the scale and the output of the scale becoming steady enough to make accurate weight measurements. Thus the addition of a scale has tended to slow down the throughput of a complete mail-handling system.

Present mail handling systems that incorporate a mail piece weighing apparatus include transport devices as part of the scale platform, or located atop the scale platform. These prior systems also stop each mail piece as it is being weighed, or slow down the speed of the mail piece significantly during the weighing process. For example, Clark, Jr. et al. U.S. Pat. No. 4,756,520 discloses a scale having a transport cage and envelope transport mechanism supported directly upon the scale. The mail piece transport system is not separate from the scale, and the envelopes are stopped in the weighing transport apparatus. Likewise, Miller et al. U.S. Pat. No. 6,759,602 discloses, in FIG. 2, a pair of mail piece weighing load cells forming part of the envelop transport platform. There is no teaching in the Miller patent of the advantages to be gained by separating the scale and transport mechanisms in a mail handling system, as in the present invention.

SUMMARY OF THE INVENTION

The present invention significantly reduces the settling time of a mail piece being weighed by separating the transport components from the scale platform. Mail weighing throughput rates of up to 10 mail pieces per second are achieved. The system of the present invention comprises three main electromechanical modules: The weighing module which includes a scale platform, load cells and electronics that provide an electrical signal indicating the weight of the mail item; the infeed drive module which delivers the moving mail item on to the scale platform; and the takeaway drive & pitch control module which pulls the mail item away from the platform and reregisters the mail piece to its original speed and position relative to the mail item ahead of the weighed mail piece in the mail stream.

BRIEF DESCRIPTION OF THE DRAWINGS

FIGS. 4 and 4a are diagrams of the electrical/electronic controls for the system disclosed in FIG. 3.

DETAILED DESCRIPTION OF THE ILLUSTRATED EMBODIMENT

Weighing Module

Figure 1:
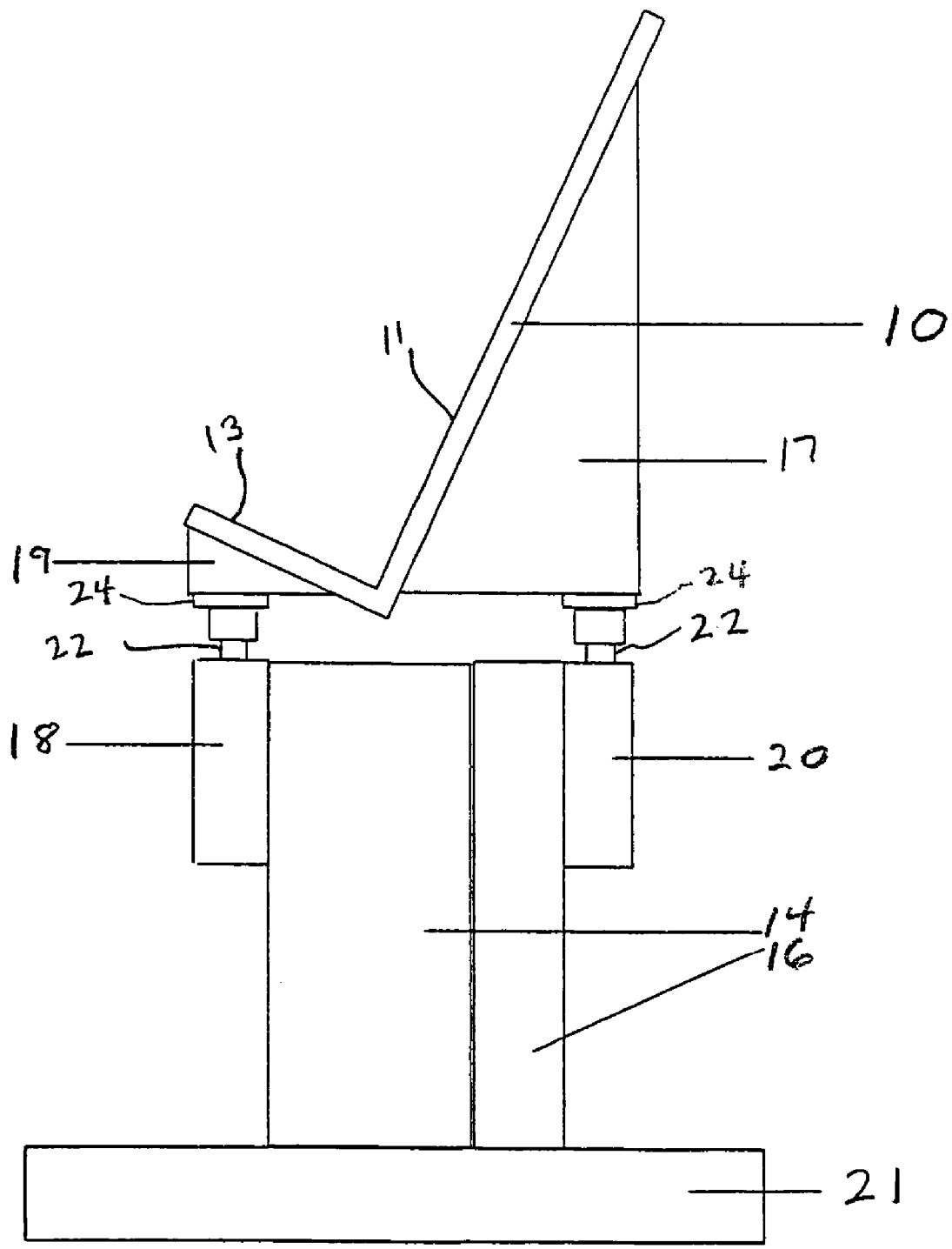
FIG. 1 is a schematic side elevation view of a weighing platform module constructed in accordance with the present invention.
Figure 3:
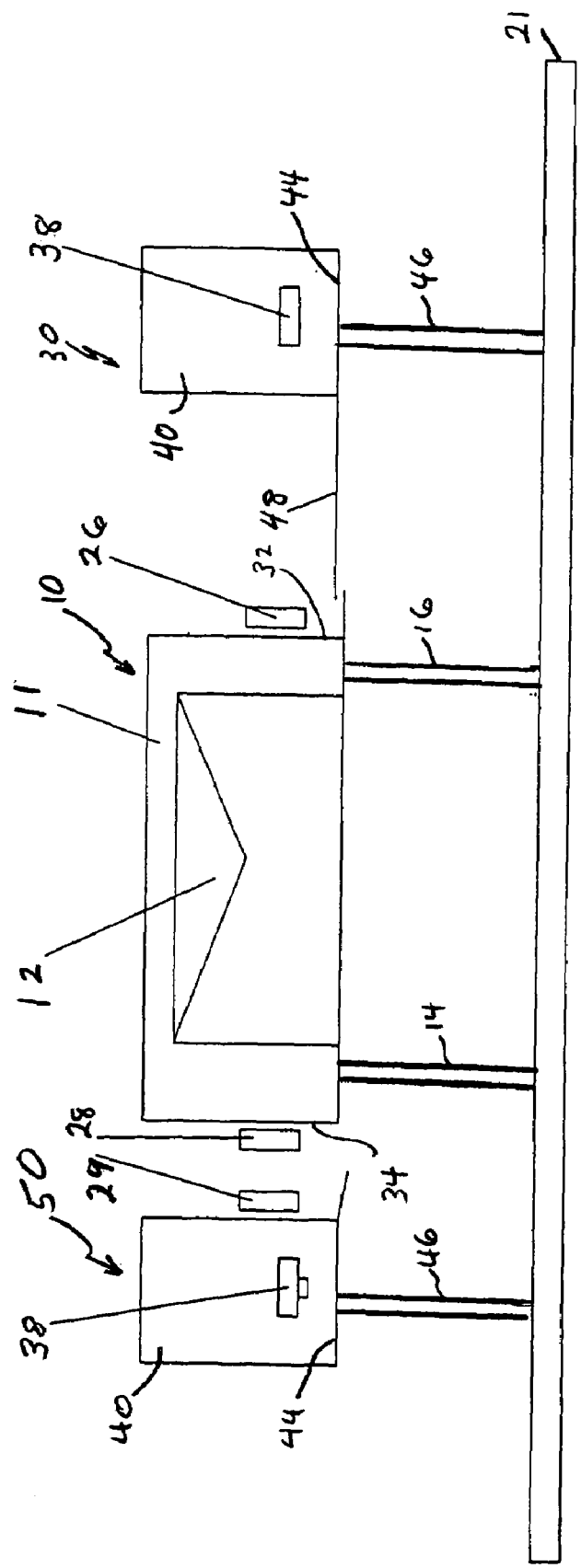
FIG. 3 is a schematic front elevation view of the infeed drive module, the weighing platform module, and the takeaway drive and pitch control module of the present invention.

Referring to FIGS. 1 and 3, the scale platform 10 consists of an L-shaped surface along which the mail item 12 (FIG. 3), normally a mail piece such as an envelope, can slide horizontally from the entry end to the exit end. In FIG. 3, the entry end of scale platform 10 is to the right. The platform is tilted back (see FIG. 1) at an angle of approximately twenty-five degrees, or any other suitable angle, so that the attitude of the mail item 12 will be stable as it moves along the platform 10. The platform 10 is composed of lightweight construction, and the surfaces 11, 13 are lined with low-friction material such as UHMW (ultra-high molecular weight) tape or equivalent. Platform 10 is also formed with at least one rear support bracket 17 and at least one front support bracket 19. The support brackets are rigidly fixed to the surfaces 11, 13 of platform 10, and maintain the approximate "L" shape of the platform.

Platform 10 is supported on vertical supports 14, 16 at three points on three load cells, two in the front 18 and one in the back 20. only one front load cell 18 is visible in the view illustrated in FIG. 1. The load cells are Futek Model L2330, or equivalent. At each support point 22, a small button magnet 24 is used to hold the platform 10 securely and removably to the load cell 18 or 20. This arrangement allows easy removal and replacement of the platform 10 to facilitate individual calibration of the load cells. This arrangement also avoids undesirable side loading of the load cells 18, 20 resulting from differential thermal expansion between the platform 10 and the supports 14, 16 on which the load cells are mounted. Vertical supports 14, 16 are rigidly mounted to a common base plate 21 to add further strength and rigidity to the platform 10.

The load cells 18, 20 have built-in overload protection and are specially selected for low mass and fast response characteristics. The load cells 18, 20 are excited using a sensor-bridge power supply (not shown), and the outputs of the load cells 18, 20 are connected to an amplifier through a summing circuit, as is known in the art. The summing circuit provides individual adjustments for each load cell circuit, so that the load cell output signals can be matched to one another. The amplifier includes offset adjustment (for setting the zero reading) and gain adjustment (for setting the correct output levels with known weights on the platform). The output of the amplifier is fed to one of many available data acquisition and readout devices.

As shown in FIG. 3, photoelectric entry sensor 26 is located adjacent the input end 34 of the platform 10, and provides a signal indicating the position of the mail item 12 on the platform. Likewise, exit sensors 28, 29 are located adjacent the exit end 34 of platform 10, and provide a signal as the mail piece 12 is leaving platform 10. When the lead edge of the mail item 12 reaches the sensors 28, 29 near the exit end 34 of the platform, the data acquisition device records the output of the amplifier as the weight of the mail item 12.

Infeed Drive Module

Figure 2:
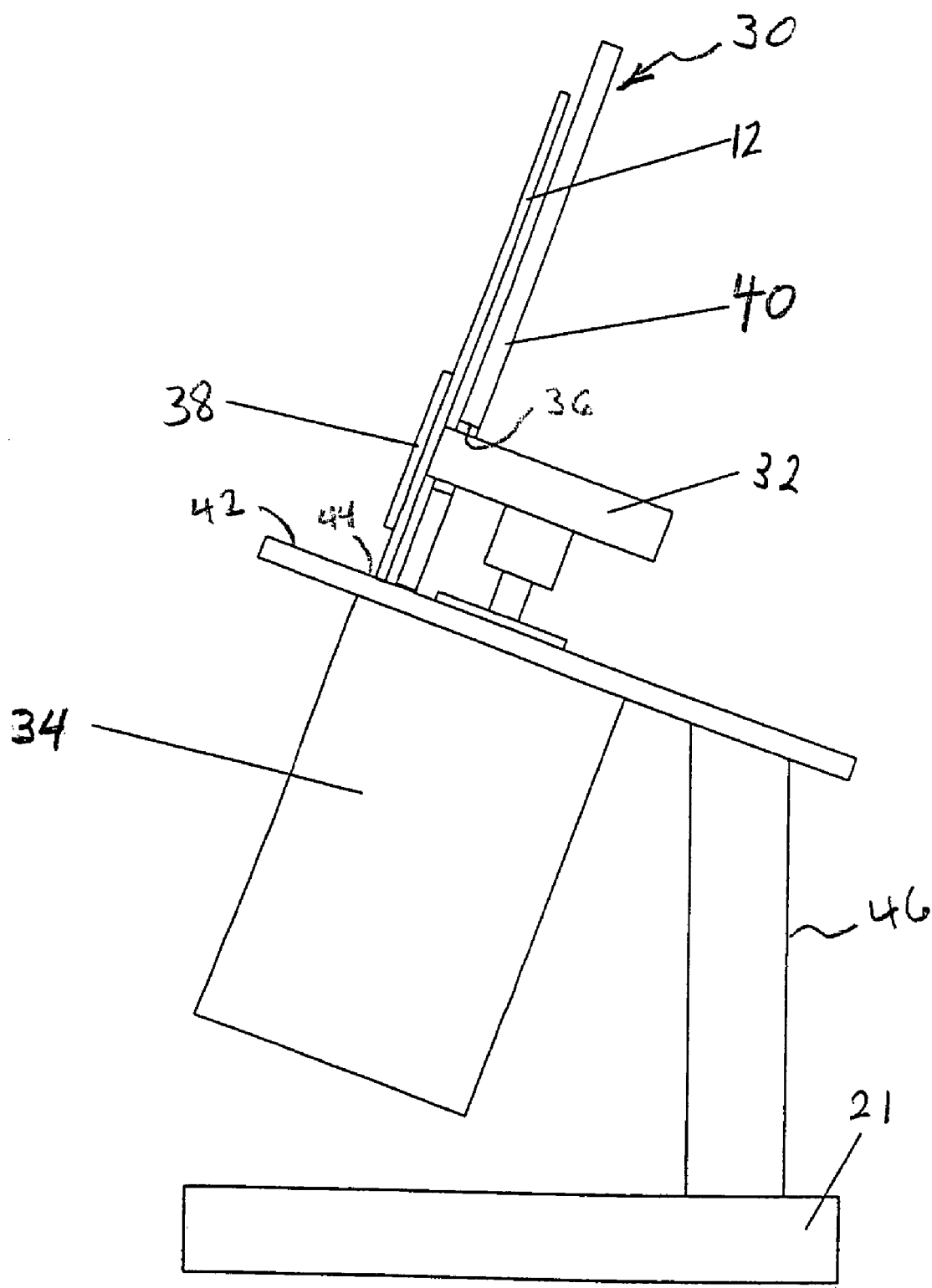
FIG. 2 is a schematic side elevation view of the infeed drive module of the present invention.

Referring to FIGS. 2 and 3, the infeed drive module 30 is designed to deliver the mail item 12 to the scale platform 10 in a smooth and jerk-free manner. The mail item 12 is driven onto platform 10 by friction from a drive roller 32 that is attached to a motor 34 that runs at a controlled speed which is set to match the nominal speed of mail items in the mail stream.

The infeed module 30 includes a guide plate 40 rigidly mounted to an angled base plate 42, whereby plates 40 and 42 provide a substantially "L" shaped support trough 44 for a mail piece 12, as shown in FIG. 2. The base plate 42 is supported by an upstanding support strut 46, and the strut 46 is firmly attached to common base plate 21.

Drive roller 32 extends through an aperture 36 disposed in guide plate 40, whereby the outer surface of drive roller 32 directly contacts and drives mail piece 12 from right to left as viewed in FIG. 3. A pressure plate or spring 38 is provided adjacent aperture 36 to apply just enough backup pressure to permit drive roller 32 to frictionally engage and advance mail piece 12 when the mail piece is in the nip between roller 32 and pressure spring 38, while at the same time not providing a force sufficient to stop mail piece 12 from continuing its sliding movement across trough 44, as described below.

When the mail item 12 leaves the drive roller 32, the momentum applied to the mail piece causes the mail piece to slide off the plates 40 and 42 of the infeed drive module 30, over a transition bridge 48 (FIG. 3), on to the scale platform 10 and all the way past the exit end 34 of the platform 10. The transition bridge 48 is lightly spring-loaded to just be lifted off the scale platform when the trail edge of the mail item 12 slides off the bridge 48 on to the scale platform 10.

Takeaway Drive & Pitch Control Module

Referring to FIGS. 2 and 3, the purpose of the takeaway drive and pitch control module 50 is to correct the speed loss sustained by the mail item 12 while coasting along the scale platform 10, and to place the mail item 12 in the correct position relative to the previous mail item in the mail stream. Module 50 is substantially identical in configuration to the infeed drive module 30, except that the motor 34 is a high-performance servo motor. The exit photo sensors 28, 29 (FIG. 3) are used to determine the position and speed of the mail item 12 exiting the scale platform 10. The pitch control algorithm sets the initial motor speed to match that of the mail item 12 exiting the scale platform 10, then accelerates the mail item to the nominal speed of the mail stream, according to a velocity profile calculated to register the mail item to the correct position in the mail stream, as is known in the art.

In applications where the mail items 12 are to be weighed in batches (as opposed to a continuous stream), the takeaway drive and pitch control module 50 can be replaced by a suitable stacker to receive and stack the mail items exiting the scale platform.

System Control

Referring to FIG. 4, the controls for the system disclosed in FIGS. 1-3 includes a load cell bridge power supply 60 that provides excitation to the load cells 18, 20 (FIG. 1). A summing amplifier 62 balances and combines the outputs of the load cells 18, 20, and zeroes the reading in the absence of an envelope 12 transversing the scale platform 10. A data acquisition unit 64 acquires the envelope weight signal from the summing amplifier 62 when the lead edge of each mail piece 12 reaches exit sensor 28. The weight data is stored to be displayed on a readout display connected to data acquisition unit 64.

Referring to FIGS. 2 and 4*a*, the infeed drive motor 34 and drive roller 32 are controlled by speed control and drive unit 35 to drive each mail piece 12 on to scale platform 10 at the system transport speed, and in a smooth and steady motion. The infeed drive module 30 is positioned so that the transitioning of the weight of the mail piece 12 from the infeed drive module onto the scale platform 10 is gradual and smooth, resulting in minimal ringing of the signal from the load cells 18, 20.

As seen in FIG. 3, entry sensor 26 is located at the upstream end of the scale platform 10, and detects the trail edge of each mail piece 12, indicating that the mail piece has fully transitioned onto the scale platform 10. Exit sensor 28 is located at the downstream end of the scale platform 10. Sensor 28 detects the lead edge of each mail piece 12 and signals data acquisition unit 64 to record the envelope weight information from load cells 18, 20. Exit sensor 29 is located at a specified known distance (approximately one to one-and-one-half inches) downstream of exit sensor 28. This distance, along with the time taken by the lead edge of the mail piece to move in the gap extending from exit sensor 28 to exit sensor 29, is used to calculate the exit velocity of the mail piece as it leaves scale platform 10.

Referring to FIG. 4, the entry and exit sensors 26, 28 and 29 are electronically connected to a servo control and drive unit 66, the latter also connected to pitch control drive motor 68. Pitch control drive motor 68 takes away and advances each mail piece 12 leaving scale platform 10, and adjusts the velocity of each mail piece to restore the mail piece to its original position and speed with respect to the preceding mail piece. The servo control and drive unit 66 calculates the exit velocity of the mail piece 12 leaving scale platform 10, and based on this velocity, calculates the acceleration and velocity profile required to restore the mail piece to its original position in the mail piece stream with respect to the previous mail piece. The servo control and drive unit 66 then drives the pitch control drive motor 68 according to this velocity profile.

The invention claimed is:

1. An apparatus for weighing mail pieces being advanced across a transport path comprising:
   a) a weighing module including a scale platform and load cells adapted to receive the advancing mail pieces, the load cells generating an electrical signal providing an indication of the weight of each mail piece on the scale platform;
   b) an in-feed drive module adapted to deliver advancing mail pieces to the scale platform;
   c) a takeaway module adapted to receive the advancing mail pieces as they leave the weighing module;
   d) the scale platform mounted independently of the in-feed module and the takeaway module, the scale platform adapted to receive advancing mail pieces at a first end of the platform, and to allow advancing mail pieces to leave the platform at a second end of the platform, the platform having an uninterrupted mail piece support surface between said first and second ends;

e) the uninterrupted mail piece support surface lined with a low-friction material.

2. The apparatus of claim 1 wherein the low-friction material is an ultra-high molecular weight tape.

3. The apparatus of claim 1 wherein the in-feed drive module includes a drive roller adapted to engage the mail pieces one at a time and drive each mail piece onto the scale platform.

4. The apparatus of claim 3 wherein the drive roller rotates at a controlled speed, which speed is adapted to match the speed of the mail pieces advancing across the transport path.

5. The apparatus of claim 1 wherein the takeaway module includes a drive roller adapted to engage each mail piece as each mail piece advances off of the scale platform and advance each mail piece at a predetermined speed.

6. The apparatus of claim 1 wherein exit sensor means disposed ahead of the takeaway module create a signal responsive to the position and speed of a mail piece as the mail piece exits the scale platform, and the initial speed of a motor driving the takeaway module drive roller is established by said sensor means to match the speed of the mail piece exiting the scale platform.

7. The apparatus of claim 6 wherein the speed of the motor is subsequently increased to accelerate the mail piece to the nominal speed of the mail in the transport path.

8. An apparatus for weighing mail pieces being advanced across a transport path comprising:

a) a weighing module including a scale platform and load cells adapted to receive the advancing mail pieces, the load cells generating an electrical signal providing an indication of the weight of each mail piece on the scale platform;

b) an in-feed drive module adapted to deliver advancing mail pieces to the scale platform;

c) a takeaway module adapted to receive the advancing mail pieces as they leave the weighing module;

d) the scale platform mounted independently of the in-feed module and the takeaway module;

e) the scale platform removably mounted on three load cells with button magnets inserted between each load cell and the scale platform to enable the removable mounting of the scale platform on the load cells.

9. The apparatus of claim 3 wherein the drive roller is operatively connected to a motor; a speed control is operatively connected to the motor; the speed control adapted to drive each mail piece onto the scale platform at the same speed as the mail pieces are advancing across the transport path.

10. The apparatus of claim 1 including a first exit sensor disposed at a downstream end of the scale platform, the first sensor detecting the lead edge of each mail piece on the scale platform and signaling a data acquisition unit to record the weight of the respective mail piece.

11. The apparatus of claim 10 including a second sensor located at a predetermined distance downstream from the first sensor in the mailstream transport path, the predetermined distance and the time taken by a leading edge of a mail piece to move between the first and second sensors used to calculate the exit speed of the mail piece leaving the scale platform.

12. The apparatus of claim 6 wherein said takeaway module includes controls that calculate the exit speed of a mail piece exiting the scale platform, and based on this velocity calculates the acceleration and velocity profile required to restore the mail piece to its original position in the mail piece transport path with respect to a previous mail piece.

* * * * *